(12) United States Patent
Guo et al.

(10) Patent No.: US 11,802,087 B2
(45) Date of Patent: Oct. 31, 2023

(54) DIELECTRIC CERAMIC COMPOSITION AND CERAMIC CAPACITOR USING THE SAME

(71) Applicant: KEMET Electronics Corporation, Fort Lauderdale, FL (US)

(72) Inventors: Hanzheng Guo, Simpsonville, SC (US); Abhijit Gurav, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 45 days.

(21) Appl. No.: 17/585,770

(22) Filed: Jan. 27, 2022

(65) Prior Publication Data

US 2022/0234958 A1    Jul. 28, 2022

Related U.S. Application Data

(60) Provisional application No. 63/142,752, filed on Jan. 28, 2021.

(51) Int. Cl.
*C04B 35/495* (2006.01)
*H01G 4/30* (2006.01)
(Continued)

(52) U.S. Cl.
CPC .......... *C04B 35/495* (2013.01); *C04B 37/003* (2013.01); *H01G 4/1209* (2013.01);
(Continued)

(58) Field of Classification Search
CPC .......... C04B 35/495; C04B 2235/3225; C04B 2235/3227; C04B 2235/3232; C04B 2235/3244; C04B 2235/3255; C04B 2235/3258; C04B 2235/3257; C04B 2235/3409; C04B 2235/3418; C04B 2235/3454; C04B 2235/442; C04B 2235/445; H01G 4/008; H01G 4/1209; H01G 4/248; H01G 4/30
See application file for complete search history.

(56) References Cited

U.S. PATENT DOCUMENTS

| 5,827,789 A | 10/1998 | Tunker et al. |
| 9,564,271 B2 | 2/2017 | Banno et al. |

(Continued)

FOREIGN PATENT DOCUMENTS

| CN | 104291821 A | 1/2015 |
| WO | WO 2021/010244 | 1/2021 |

OTHER PUBLICATIONS

ISA/US; International Search Report and Written Opinion prepared for PCT/US22/13984; dated Jun. 1, 2022.

(Continued)

*Primary Examiner* — Nathan Milakovich
(74) *Attorney, Agent, or Firm* — Joseph T. Guy; Patent Filing Specialist Inc.

(57) ABSTRACT

The present invention discloses a dielectric ceramic formula enabling one to obtain a multilayer ceramic capacitor by alternatively stacking the ceramic dielectric layers and base metal internal electrodes. The dielectric ceramic composition comprises a primary ingredient:

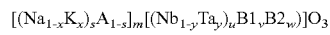

$[(Na_{1-x}K_x)_s A_{1-s}]_m [(Nb_{1-y}Ta_y)_u B1_v B2_w)]O_3$ wherein:
A, B1, B2, x, y, s, u, v, w and m are defined.

31 Claims, 1 Drawing Sheet

(51) Int. Cl.
*H01G 4/12* (2006.01)
*H01G 4/248* (2006.01)
*C04B 37/00* (2006.01)
*H01G 4/008* (2006.01)

(52) U.S. Cl.
CPC ............... *H01G 4/248* (2013.01); *H01G 4/30* (2013.01); *C04B 2235/3225* (2013.01); *C04B 2235/3227* (2013.01); *C04B 2235/3232* (2013.01); *C04B 2235/3244* (2013.01); *C04B 2235/3255* (2013.01); *C04B 2235/3258* (2013.01); *C04B 2235/3267* (2013.01); *C04B 2235/3409* (2013.01); *C04B 2235/3418* (2013.01); *C04B 2235/3454* (2013.01); *C04B 2235/442* (2013.01); *C04B 2235/445* (2013.01); *C04B 2235/9607* (2013.01); *C04B 2237/123* (2013.01); *C04B 2237/345* (2013.01); *H01G 4/008* (2013.01)

(56) References Cited

U.S. PATENT DOCUMENTS

| | | |
|---|---|---|
| 10,710,934 B2 | 7/2020 | Banno |
| 2005/0117274 A1 | 6/2005 | Miyauchi et al. |
| 2006/0063009 A1 | 3/2006 | Naitou et al. |
| 2010/0008019 A1 | 1/2010 | Burn |
| 2010/0294419 A1 | 11/2010 | Feltz et al. |
| 2016/0005541 A1* | 1/2016 | Banno .................. H01G 4/224 |
| | | 156/89.15 |
| 2019/0189904 A1 | 6/2019 | Benedict et al. |
| 2019/0218146 A1* | 7/2019 | Banno ..................... H01G 4/30 |
| 2019/0237263 A1 | 8/2019 | Kaneda |
| 2022/0238277 A1* | 7/2022 | Guo ......................... H01G 4/30 |

OTHER PUBLICATIONS

ISA/US; International Preliminary Report on Patentability prepared for PCT/US22/13984; dated May 9, 2023.

* cited by examiner

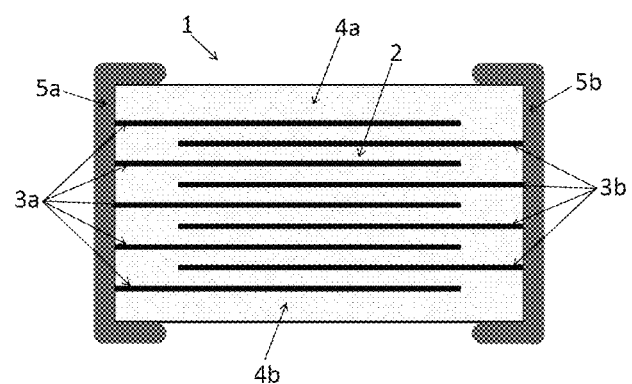

DIELECTRIC CERAMIC COMPOSITION AND CERAMIC CAPACITOR USING THE SAME

CROSS-REFERENCE TO RELATED APPLICATIONS

This application claims priority to U.S. Provisional Application No. 63/142,752 filed Jan. 28, 2021 which is incorporated herein by reference.

FIELD OF THE INVENTION

This application is related to a dielectric ceramic formulation and multilayer ceramic capacitors using the same. The dielectric ceramic formulation enables a co-firing with internal electrodes comprising base metals at low oxygen partial pressure, and the multilayer ceramic capacitors manufactured thereof used for the application at high temperatures.

BACKGROUND

With the booming growth of information and electronic industry over the past two decades, multilayer ceramic capacitor manufacturing thrives on the increasing demand of electrical energy storage components in numerous applications, such as portable electronics, personal computers, cellular phones, televisions and the like. In these cases, BaTiO$_3$ has been overwhelmingly adopted as the essential ceramic dielectric materials due to its high dielectric constant, low dielectric loss, and stable capacitance variation over the temperature range from −55° C. to 125° C. However, BaTiO$_3$ has been well known as a ferroelectric material which experiences a ferroelectric-to-paraelectric phase transition around 125° C., yielding a significant reduction of dielectric constant along with an abrupt drop of the temperature coefficient of capacitance. Nowadays, with the emergence of new electronic applications at extreme environments, such as engine control units, down-hole drilling exploration, pulse power electronics and so on, requires maintaining a stable capacitance in a maximum working temperature window of 175° C.-200° C. or even higher. Even though tremendous research activities have been performed to stabilize the temperature-capacitance characteristic of BaTiO$_3$-based capacitors via extensive doping modification packages, the extended working temperature is still limited to around 150° C. Therefore, it has attracted considerable attentions to develop new dielectric materials that can enable harsh environment applications at 175° C.-200° C. or above. Very recently, alkaline niobate-based ceramics, such as NaNbO$_3$, was found as feasible candidates to develop high temperature capacitors via proper doping selections. Doping of alkaline-earth zirconates such as CaZrO$_3$ and SrZrO$_3$, or alkaline-earth hafnates such as CaHfO$_3$ and SrHfO$_3$ have also been considered.

Detailed firing studies and defect chemistry investigations reported in the literature have suggested that alkaline niobate-based ceramics are capable of co-firing with base metals, such as Cu and Ni, at low oxygen partial pressures owing to well-tailored chemical thermodynamics to mitigate the volatility of alkaline elements. In U.S. Pat. No. 9,564,271 and WO 2018/062084A1 both of which are incorporated by reference, (K,Na)NbO$_3$-based and NaNbO$_3$-based ceramics were respectively demonstrated to be compatible with co-firing with Ni internal electrodes in reducing atmosphere. However, the dielectric ceramic compositions disclosed in both comprise Li. As a light element, Li has been known to have easy mobility in electro-ceramic materials and may introduce a high leakage current, particularly in harsh environment, such as under a high voltage and/or a high temperature, or in a humid environment. Apparently, this leakage current is deleterious to dielectric capacitors in terms of insulation stability and life reliability.

In spite of the extensive effort new formulations are still required to meet the demands of modern electronics.

SUMMARY OF THE INVENTION

The present invention is related to improved ceramics wherein the ceramics exhibit superior thermal stability. The present invention is also related to improved capacitors comprising the improved ceramics.

These and other embodiments, as will be realized, are provided in a dielectric ceramic composition comprising:
a primary component defined as:

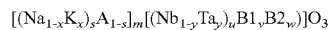

wherein:
A is at least one element selected from the alkaline-earth element group of Mg, Ca, Sr, and Ba;
B1 is at least one element selected from the group of Ti, Zr, Hf, and Sn;
B2 is at least one element selected from transition metal element group of V, Cr, Mo, W, Mn, Fe, Co, Ni, Cu, and Zn;
and wherein:
x, y, s, u, v, and w are molar fractions of respective elements; and
m is the molar ratio of $[(Na_{1-x}K_x)_sA_{1-s}]$ and $[(Nb_{1-y}Ta_y)_uB1_vB2_w)]$;
wherein
$0.93 \leq m \leq 1.07$;
$0.7 \leq s \leq 1.0$;
$0 \leq x \leq 0.05$; $0 \leq y \leq 0.65$;
$0.7 \leq u \leq 1.0$; $0 \leq v \leq 0.3$; $0.001 \leq w \leq 0.100$;
a first sub-component comprising at least one rare-earth selected from the group consisting of Y, Sc, La, Ce, Pr, Nd, Sm, Eu, Gd, Tb, Dy, Ho, Er, Tm, Yb and Yu; and
a second sub-component comprising a frit.

Yet another embodiment is provided in a multilayered ceramic capacitor comprising:
a plurality of dielectric ceramic layers wherein each layer comprises a dielectric composition defined by:
a primary component defined as:

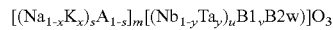

wherein:
A is at least one element selected from the alkaline-earth element group of Mg, Ca, Sr, and Ba;
B1 is at least one element selected from the group of Ti, Zr, Hf, and Sn;
B2 is at least one element selected from transition metal element group of V, Cr, Mo, W, Mn, Fe, Co, Ni, Cu, and Zn;
and wherein:
x, y, s, u, v, and w are molar fractions of respective elements; and
m is the molar ratio of $[(Na_{1-x}K_x)_sA_{1-s}]$ and $[(Nb_{1-y}Ta_y)_uB1_vB2_w)]$;
wherein:
$0.93 \leq m \leq 1.07$;
$0.7 \leq s \leq 1.0$;
$0 \leq x \leq 0.05$; $0 \leq y \leq 0.65$;
$0.7 \leq u \leq 1.0$; $0 \leq v \leq 0.3$; $0.001 \leq w \leq 0.100$;

a first sub-component comprising at least one rare-earth selected from the group consisting of Y, Sc, La, Ce, Pr, Nd, Sm, Eu, Gd, Tb, Dy, Ho, Er, Tm, Yb and Yu; and a second sub-component comprising a frit;

a plurality of internal electrodes comprising base metals of Ni, Cu or alloys thereof; and a pair of external electrodes formed at each end of the capacitor element main body.

Yet another embodiment is provided in a method of forming a multilayered ceramic capacitor comprising:

forming a dielectric ceramic precursor;

interleaving layers of said dielectric ceramic precursor with layers of metal to form a stack;

compressing said stack and sintering said dielectric precursor to form dielectric ceramic layers having a composition defined by:

a primary component defined as:

$$[(Na_{1-x}K_x)_sA_{1-s}]_m[(Nb_{1-y}Ta_y)_uB1_vB2_w)]O_3$$

wherein:

A is at least one element selected from the alkaline-earth element group of Mg, Ca, Sr, and Ba;

B1 is at least one element selected from the group of Ti, Zr, Hf, and Sn;

B2 is at least one element selected from transition metal element group of V, Cr, Mo, W, Mn, Fe, Co, Ni, Cu, and Zn;

and wherein:

x, y, s, u, v, and w are molar fractions of respective elements; and m is the molar ratio of $[(Na_{1-x}K_x)_sA_{1-s}]$ and $[(Nb_{1-y}Ta_y)_uB1_vB2_w)]$;

wherein $0.93 \leq m \leq 1.07$;

$0.7 \leq s \leq 1.0$;

$0 \leq x \leq 0.05$;

$0 \leq y \leq 0.65$;

$0.7 \leq u \leq 1.0$;

$0 \leq v \leq 0.3$;

$0.001 \leq w \leq 0.100$;

a first sub-component comprising at least one rare-earth selected from the group consisting of Y, Sc, La, Ce, Pr, Nd, Sm, Eu, Gd, Tb, Dy, Ho, Er, Tm, Yb and Yu; and a second sub-component comprising a frit.

BRIEF DESCRIPTION OF DRAWINGS

FIG. 1 is a schematic cross-sectional view of a multilayer ceramic capacitor using the dielectric ceramic composition according to the present invention.

DESCRIPTION

The present invention provides a dielectric ceramic composition that enables a good temperature-capacitance characteristic from low to high temperatures. Specifically, capacitors made by the disclosed dielectric ceramic composition is possible to have a temperature coefficient of capacitance within ±25% over a temperature range from −55° C. to 200° C. relative to capacitance at 25° C. The inventive dielectric ceramic has a dielectric constant of at least 100 and preferably at least 900 to no more than 2000 at 25° C.

The present invention also provide a dielectric ceramic composition that is compatible with co-firing internal electrode using inexpensive base metals such as Ni and the like in reducing atmosphere.

Therefore, the present invention provides a multi-layered ceramic capacitor device formed by a plurality of laminated ceramic layers and a plurality of internal electrode layers in a pattern wherein the ceramic layers and internal electrode layers are alternatively stacked. The ceramic layers are made by the present dielectric composition, and the internal electrodes layers are made by conductive paste mainly containing base metals such as Ni and the like. The obtained multilayer ceramic capacitor is possible to have a temperature coefficient of capacitance within ±25% over a temperature range from −55° C. to 200° C. after co-firing at low oxygen partial pressure.

The abovementioned objectives are possible to be achieved in a multilayer ceramic capacitor device with a dielectric ceramic composition comprises:

$$[(Na_{1-x}K_x)_sA_{1-s}]_m[(Nb_{1-y}Ta_y)_uB1_vB2_w)]O_3$$

wherein:

A is at least one selected from the alkaline-earth element group of Mg, Ca, Sr, and Ba;

B1 is at least one selected from the group of Ti, Zr, Hf, and Sn;

B2 is at least one selected from transition metal elements; and wherein:

x, y, s, u, v, and w are molar fractions of respective elements, and m is the molar ratio of $[(Na_{1-x}K_x)_sA_{1-s}]$ and $[(Nb_{1-y}Ta_y)_uB1_vB2_w)]$. They are in the following respective range:

$0.93 \leq m \leq 1.07$;

$0.7 \leq s \leq 1.0$;

$0 \leq x \leq 0.05$; $0 \leq y \leq 0.65$; and $0.7 \leq u \leq 1.0$; $0.0 \leq v \leq 0.3$; $0.001 \leq w \leq 0.100$.

Together with the main component, sub-components are also included.

A first sub-component comprises of at least one element selected from the rare-earth compounds, which is no more than 10 mol % parts with respect to the main component; and a second sub-component composes a compound with low melting temperature to assist the ceramic sintering process, also referred to as a frit, which is Li free and is preferable at least one compound selected from fluorides, silicates, borides, and oxides. The content of the frit is within the range of 0.01 mol % to 15.00 mol % parts with respect to the main component.

To obtain the disclosed dielectric ceramic composition, (1) a precursor is firstly prepared upon calcination; a precursor here is defined as an intermediate compound or a group of compounds that is produced from certain raw ceramic powders, wherein the precursor may contain all or partial constituent elements of the final composition, but the final form of the material is not obtained until the precursor is further mixed with other reactants and treated under certain thermal conditions to achieve the desired chemistry; (2) then a mixture of the obtained precursor and other dopants such as transition metal compound, rare-earth compound, and frit, is further prepared in the form of a paste with the assistance of various organic blends prior to sintering; and (3) lastly, a composition comprising the obtained paste mixture forms a dielectric ceramic material disclosed in this invention upon a sintering process. One example is listed in TABLE 1. The precursor mainly contains $NaNbO_3$—$SrZrO_3$ ceramic, which is prepared upon calcination by pre-reacted oxides and carbonates such as $Na_2CO_3$, $SrCO_3$, $Nb_2O_5$, and $ZrO_2$. The inorganic dopants used to form the paste prior sintering are $MnCO_3$, $CeO_2$, and $SiO_2$.

TABLE 1

| Compounds used to form a precursor | Na$_2$CO$_3$, SrCO$_3$, Nb$_2$O$_5$, ZrO$_2$ |
|---|---|
| Dopants | MnCO$_3$, CeO$_2$, SiO$_2$ |

The dielectric ceramic material may be also obtained by another route beginning with more than one precursor, as exemplified in TABLE 2, using the same starting raw materials as in TABLE 1. In this case, two precursors, mainly containing NaNbO$_3$ for precursor 1 and SrZrO$_3$ for precursor 2, are made separately by calcination. Then, a paste is formed by a blend of NaNbO$_3$, SrZrO$_3$, MnCO$_3$, CeO$_2$, and SiO$_2$, together with organic mixtures. After sintering, the formulation of TABLE 2 will result in approximately the same dielectric material composition as that made by the formulation of TABLE 1.

TABLE 2

| Compounds used to form precursor 1 | Na$_2$CO$_3$, Nb$_2$O$_5$ |
|---|---|
| Compounds used to form precursor 2 | SrCO$_3$, ZrO$_2$ |
| Dopants | MnCO$_3$, CeO$_2$, SiO$_2$ |

The following description set forth in more fully examples illustrating the foregoing and other features of this invention without limit thereto. These examples, however, are indicative of just a few of the various ways in which the principles of the invention may be adopted and are not intended to limit the scope of the invention.

The dielectric ceramic composition of this invention comprises a primary component together with sub-components, wherein the said primary component is expressed by the formula:

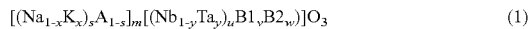
$$[(Na_{1-x}K_x)_sA_{1-s}]_m[(Nb_{1-y}Ta_y)_uB1_vB2_w)]O_3 \quad (1)$$

wherein:

A is at least one selected from the alkaline-earth element group of Mg, Ca, Sr, and Ba; preferably A is Ba, Sr and/or Ca.

B1 is at least one selected from the group of Ti, Zr, Hf, and Sn; preferably B1 is Zr and/or Hf;

B2 is transition metal element, preferably one selected from V, Cr, Mo, W, Mn, Fe, Co, Ni, Cu, Zn and combination thereof; preferably B2 is at least one of V, W, Mo, Cr, and Mn.

In formula (1), x, y, s, u, v, and w are molar fractions of respective elements, and m is the molar ratio of $[(Na_{1-x}K_x)_sA_{1-s}]$ and $[(Nb_{1-y}Ta_y)_uB1_vB2_w)]$. They are in the following respective range:

$0.93 \le m \le 1.07$;
$0.7 \le s \le 1.0$;
$0 \le x \le 0.05$; $0 \le y \le 0.65$;
$0.7 \le u \le 1.0$; $0 \le v \le 0.3$; $0.001 \le w \le 0.100$;

A first sub-component comprises at least one rare-earth element preferably selected from the group consisting of Y, Sc, La, Ce, Pr, Nd, Sm, Eu, Gd, Tb, Dy, Ho, Er, Tm, Yb and Yu. The amount of the rare-earth element added is no more than 10 mol % parts with respect to the main component. The values of molar friction are calculated on a basis of YO$_{3/2}$, ScO$_{3/2}$, LaO$_{3/2}$, CeO$_2$, PrO$_{11/6}$, NdO$_{3/2}$, SmO$_{3/2}$, EuO$_{3/2}$, GdO$_{3/2}$, TbO$_{7/4}$, DyO$_{3/2}$, HoO$_{3/2}$, ErO$_{3/2}$, TmO$_{3/2}$, YbO$_{3/2}$ and LuO$_{3/2}$.

A second sub-component comprises a compound having low melting temperature, referred to as a frit, to assist the ceramic sintering process. The composition of the frit is not limited to any form and preferably could be at least one selected from fluorides such as NaF, KF, MgF$_2$, silicates such as Si, SiO$_2$, (Ba$_x$Sr$_y$Ca$_{1-x-y}$)SiO$_3$ (0≤x,y≤1), borides such as B$_2$O$_3$, and oxides such as Na$_2$O, MoO$_3$, V$_2$O$_5$ and the like. The content of the frit is within the range of 0.01 mol % to 15.00 mol % parts with respect to the main component. The frit does not contain Li as main component defined as less than 0.10 mol % lithium, preferably less than 0.05 mol % lithium, more preferably less than 0.01 mol % lithium and even more preferably below the detectable limit for lithium to account for impurities of Li which cannot be practically eliminated.

To obtain the disclosed dielectric ceramic composition in the ceramic layers 2 in the multilayer ceramic capacitor 1 shown in FIG. 1, K$_2$CO$_3$, Na$_2$CO$_3$, BaCO$_3$, SrCO$_3$, CaCO$_3$, Ta$_2$O$_5$, Nb$_2$O$_5$, TiO$_2$, ZrO$_2$, HfO$_2$, transition metal compound, rare-earth compound, and frit are prepared as starting ceramic raw materials. The proportion of these compounds in the raw material is pre-determined such that after sintering, the dielectric ceramic composition disclosed in the present invention may be obtained. Further, as raw material compounds containing respective constituent elements in the disclosed dielectric formula, not only oxides and carbonates, hydroxides could be also used. Specifically, the raw materials are not limited to any form. For example, Mn can be added in terms of MnO, MnO$_2$, MnCO$_3$ and the like; this applies to all other raw materials. The main constituent raw materials are weighted to satisfy the disclosed composition formula, and then wet mixed together with suitable solvent such as water, ethanol, isopropanol, toluene, ethyl acetate, propyl acetate, butyl acetate, mineral spirits or other suitable hydrocarbon liquid, or a lend thereof via ball milling with yttrium stabilized zirconium media. After drying and calcination, a ceramic material prior sintering is thus obtained.

The calcined powders described herein are further wet milled with the addition of water and/or suitable organic additives such as binder, dispersant, solvent, plasticizer and the like, to form a ceramic slip. No particular limit is imposed on the choice of organic additives or the organic content used herein.

To obtain the ceramic slip described herein and the disclosed ceramic composition hereafter, the preparation step is not limited to the abovementioned process and could be in a way that a precursor material is made first by calcination and then mixed with precursors or dopants contain other constituent elements of the desired composition to form a ceramic slip with suitable organic additives before sintering.

Examples 1 to 4 illustrate the invention but which do not limit the scope of the invention thereto. Modifications apparent to one having skill in the art are subsumed within the scope of the invention.

Example 1

K$_2$CO$_3$, Na$_2$CO$_3$, BaCO$_3$, SrCO$_3$, CaCO$_3$, Ta$_2$O$_5$, Nb$_2$O$_5$, TiO$_2$, and ZrO$_2$ are mixed as starting ceramic raw materials to prepare a precursor after calcination at 750° C. to 1300° C., wherein starting ceramic materials comprise:

from 0.1 mol % to 2.0 mol % K from K$_2$CO$_3$;
from 90.0 mol % to 95.5 mol % Na from Na$_2$CO$_3$;
from 0.1 mol % to 2.7 mol % Ba from BaCO$_3$;
from 0.1 mol % to 5.3 mol % Sr from SrCO$_3$;
from 0.1 mol % to 6.6 mol % Ca from CaCO$_3$;
from 0.1 mol % to 5.5 mol % Ta from Ta$_2$O$_5$;
from 90.0 mol % to 95.5 mol % Nb from Nb$_2$O$_5$;
from 0.05 mol % to 1.20 mol % Ti from TiO$_2$;
from 0.1 mol % to 6.6 mol % Zr from ZrO$_2$;

and then a mixture of transition metal oxide, rare-earth oxide, and frit comprises of:
from 0.1 mol % to 2.4 mol % Mn from $MnO_2$;
from 0.2 mol % to 4.8 mol % Pr from $Pr_6O_{11}$;
from 0.01 mol % to 3.30 mol % frit from $SiO_2$;
is added as dopants together with suitable organic additives to form a ceramic slip.

Example 2

$K_2CO_3$, $Na_2CO_3$, $BaCO_3$, $SrCO_3$, $CaCO_3$, $Ta_2O_5$, $Nb_2O_5$, $ZrO_2$, $HfO_2$, and transition metal oxides such as $MnO_2$ and $MoO_3$ are mixed as starting ceramic raw materials to prepare a precursor after calcination at 750° C. to 1300° C., wherein the starting ceramic materials comprise:
from 0.1 mol % to 2.0 mol % K from $K_2CO_3$;
from 90.0 mol % to 95.5 mol % Na from $Na_2CO_3$;
from 0.1 mol % to 1.7 mol % Ba from $BaCO_3$;
from 0.1 mol % to 3.3 mol % Sr from $SrCO_3$;
from 0.1 mol % to 6.6 mol % Ca from $CaCO_3$;
from 0.1 mol % to 5.5 mol % Ta from $Ta_2O_5$;
from 90.0 mol % to 95.5 mol % Nb from $Nb_2O_5$;
from 0.1 mol % to 6.6 mol % Zr from $ZrO_2$;
from 0.05 mol % to 1.20 mol % Hf from $HfO_2$;
from 0.1 mol % to 2.4 mol % Mn from $MnO_2$;
from 0.01 mol % to 0.80 mol % Mo from $MoO_3$;
and then a mixture of rare-earth oxide and frit comprises:
from 0.6 mol % to 5 mol % Y from $Y_2O_3$;
from 0.01 mol % to 3.30 mol % frit from $CaSiO_3$;
is added as dopants together with suitable organic additives to form a ceramic slip.

Example 3

$Na_2CO_3$, $SrCO_3$, $CaCO_3$, $Ta_2O_5$, $Nb_2O_5$, $ZrO_2$, $HfO_2$, and rare-earth oxide such as $Y_2O_3$ are mixed as starting ceramic raw materials to prepare a precursor after calcination at 750° C. to 1300° C., wherein starting ceramic materials comprise of:
from 87.0 mol % to 92.5 mol % Na from $Na_2CO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 90.0 mol % to 95.5 mol % Nb from $Nb_2O_5$;
from 0.1 mol % to 6.6 mol % Zr from $ZrO_2$;
from 0.05 mol % to 1.20 mol % Hf from $HfO_2$;
from 0.2 mol % to 3.7 mol % Pr from $Pr_6O_{11}$;
and then a mixture of transition metal oxide, rare-earth oxide, and frit comprises:
from 0.1 mol % to 2.7 mol % Mn from $MnO_2$;
from 0.01 mol % to 3.30 mol % frit from NaF;
is added as dopants together with suitable organic additives to form a ceramic slip.

Example 4

$Na_2CO_3$, $SrCO_3$, $CaCO_3$, $Ta_2O_5$, $Nb_2O_5$, $ZrO_2$, rare-earth oxide such as $La_2O_3$, transition metal oxide such as $MnO_2$ and rare-earth oxide such as $La_2O_3$ are mixed as starting ceramic raw materials to prepare a precursor after calcination at 750° C. to 1300° C., wherein starting ceramic materials comprise of:
from 87.0 mol % to 92.5 mol % Na from $Na_2CO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 87.0 mol % to 92.5 mol % Nb from $Nb_2O_5$;
from 0.1 mol % to 6.6 mol % Zr from $ZrO_2$;
from 0.1 mol % to 2.4 mol % Mn from $MnO_2$;
from 0.2 mol % to 4.8 mol % La from $La_2O_3$;
and then frit comprises:
from 0.01 mol % to 5.90 mol % NaF;
is added as dopants together with suitable organic additives to form a ceramic slip.

Further, dopants like transition metal compound, rare-earth compound, and frit can be also added in two separate steps to obtain the desired dielectric composition disclosed in this invention. It means that partial amount of transition metal compound, rare-earth compound, and/or frit is firstly added in the raw materials to prepare a precursor after calcination at 750° C. to 1300° C., which is defined as step 1; and then another amount of transition metal compound, rare-earth compound, and/or frit is further added to the precursor together with suitable organic additives to form a ceramic slip, which is defined as step 2. The transition metal compound added in step 1 and in step 2 could be the same compound containing the same target transition metal element or could be different compounds containing different target transition metal elements. This also applies to the rare-earth compound and frit if they are added separately in step 1 and step 2. The total amount of transition metal element, rare-earth element, and frit added in step 1 and step 2 satisfies the value range specified in this invention.

Examples 5 to 9 illustrate the invention but which do not limit the scope of the invention. Modifications apparent to one having skill in the art are subsumed within the scope of the invention.

Example 5

$Na_2CO_3$, $BaCO_3$, $SrCO_3$, $CaCO_3$, $Ta_2O_5$, $Nb_2O_5$, $ZrO_2$, $HfO_2$ and transition metal oxides such as $MoO_3$ are mixed as starting ceramic raw materials to prepare a precursor after calcination at 750° C. to 1300° C., wherein starting ceramic materials comprise:
from 87.0 mol % to 92.5 mol % Na from $Na_2CO_3$;
from 0.1 mol % to 2.7 mol % Ba from $BaCO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 87.0 mol % to 92.5 mol % Nb from $Nb_2O_5$;
from 0.1 mol % to 6.6 mol % Zr from $ZrO_2$;
from 0.05 mol % to 1.20 mol % Hf from $HfO_2$;
from 0.01 mol % to 0.80 mol % Mo from $MoO_3$;
and then a mixture of transition metal oxide, rare-earth oxide, and frit comprises:
from 0.1 mol % to 2.4 mol % Mn from $MnO_2$;
from 0.6 mol % to 5.0 mol % Y from $Y_2O_3$;
from 0.01 mol % to 5.90 mol % frit from NaF;
is further added as dopants together with suitable organic additives to form a ceramic slip.

Example 6

$Na_2CO_3$, $BaCO_3$, $SrCO_3$, $CaCO_3$, $Ta_2O_5$, $Nb_2O_5$, $TiO_2$, $ZrO_2$, $HfO_2$ and rare-earth oxide such as $Y_2O_3$ are mixed as starting ceramic raw materials to prepare a precursor after calcination at 750° C. to 1300° C., wherein starting ceramic materials comprise:
from 90.0 mol % to 95.5 mol % Na from $Na_2CO_3$;
from 0.1 mol % to 1.7 mol % Ba from $BaCO_3$;
from 0.1 mol % to 3.3 mol % Sr from $SrCO_3$;
from 0.1 mol % to 6.6 mol % Ca from $CaCO_3$;
from 0.1 mol % to 5.5 mol % Ta from $Ta_2O_5$;

from 90.0 mol % to 95.5 mol % Nb from $Nb_2O_5$;
from 0.05 mol % to 1.20 mol % Ti from $TiO_2$;
from 0.1 mol % to 6.6 mol % Zr from $ZrO_2$;
from 0.05 mol % to 1.20 mol % Hf from $HfO_2$;
from 0.1 mol % to 2.2 mol % Y from $Y_2O_3$;
and then a mixture of rare-earth oxide, transition metal oxide, and frit comprises:
from 0.1 mol % to 2.4 mol % Mn from $MnO_2$;
from 0.1 mol % to 3.8 mol % Dy from $Dy_2O_3$;
from 0.01 mol % to 3.3 mol % frit from $CaSiO_3$;
is further added as dopants together with suitable organic additives to form a ceramic slip.

Example 7

$Na_2CO_3$, $BaCO_3$, $SrCO_3$, $CaCO_3$, $Ta_2O_5$, $Nb_2O_5$, $ZrO_2$, and transition metal oxides such as $MnO_2$ are mixed as starting ceramic raw materials to prepare a precursor after calcination at 750° C. to 1300° C., wherein starting ceramic materials comprise:
from 90.0 mol % to 95.5 mol % Na from $Na_2CO_3$;
from 0.1 mol % to 2.7 mol % Ba from $BaCO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 90.0 mol % to 95.5 mol % Nb from $Nb_2O_5$;
from 0.1 mol % to 6.6 mol % Zr from $ZrO_2$;
from 0.1 mol % to 2.2 mol % Mn from $MnO_2$;
and then a mixture of rare-earth oxide, transition metal oxide, and frit comprises:
from 0.1 mol % to 2.4 mol % Mn from $MnO_2$;
from 0.6 mol % to 5.0 mol % Y from $Y_2O_3$;
from 0.01 mol % to 3.30 mol % frit from KF;
is further added as dopants together with suitable organic additives to form a ceramic slip.

Example 8

$K_2CO_3$, $Na_2CO_3$, $SrCO_3$, $CaCO_3$, $Ta_2O_5$, $Nb_2O_5$, $ZrO_2$, $HfO_2$, transition metal oxides such as $WO_3$, and frit such as $SiO_2$ are mixed as starting ceramic raw materials to prepare a precursor after calcination at 750° C. to 1300° C., wherein starting ceramic materials comprise:
from 0.1 mol % to 2.0 mol % K from $K_2CO_3$;
from 87.0 mol % to 92.5 mol % Na from $Na_2CO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 87.0 mol % to 92.5 mol % Nb from $Nb_2O_5$;
from 0.1 mol % to 6.6 mol % Zr from $ZrO_2$;
from 0.05 mol % to 1.20 mol % Hf from $HfO_2$;
from 0.01 mol % to 0.80 mol % W from $WO_3$;
from 0.01 mol % to 0.85 mol % frit from $SiO_2$;
and then a mixture of rare-earth oxide, transition metal oxide, and frit comprises:
from 0.1 mol % to 2.4 mol % Mn from $MnO_2$;
from 0.6 mol % to 4.0 mol % Y from $Y_2O_3$;
from 0.01 mol % to 3.30 mol % frit from $BaSiO_3$;
is further added as dopants together with suitable organic additives to form a ceramic slip.

Example 9

$Na_2CO_3$, $BaCO_3$, $SrCO_3$, $CaCO_3$, $Ta_2O_5$, $Nb_2O_5$, $TiO_2$, $ZrO_2$, transition metal oxides such as $MoO_3$, rare-earth oxide such as $Y_2O_3$, and frit such as $SiO_2$ are mixed as starting ceramic raw materials to prepare a precursor after calcination at 750° C. to 1300° C., wherein starting ceramic materials comprise:
from 87.0 mol % to 92.5 mol % Na from $Na_2CO_3$;
from 0.1 mol % to 2.7 mol % Ba from $BaCO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 87.0 mol % to 92.5 mol % Nb from $Nb_2O_5$;
from 0.05 mol % to 1.20 mol % Ti from $TiO_2$;
from 0.1 mol % to 6.6 mol % Zr from $ZrO_2$;
from 0.01 mol % to 1.80 mol % Mo from $MoO_3$;
from 0.1 mol % to 2.0 mol % Y from $Y_2O_3$;
from 0.01 mol % to 1.40 mol % frit from $SiO_2$;
and then a mixture of rare-earth oxide, transition metal oxide, and frit comprises:
from 0.1 mol % to 2.4 mol % Mn from $MnO_2$;
from 0.6 mol % to 4.0 mol % Y from $Y_2O_3$;
from 0.01 mol % to 3.30 mol % frit from $CaSiO_3$;
is further added as dopants together with suitable organic additives to form a ceramic slip.

Example 10

$Na_2CO_3$, $BaCO_3$, $SrCO_3$, $CaCO_3$, $Ta_2O_5$, $Nb_2O_5$, $TiO_2$, $ZrO_2$, $HfO_2$, and frit such as $SiO_2$ are mixed as starting ceramic raw materials to prepare a precursor after calcination at 750° C. to 1300° C., wherein starting ceramic materials comprise:
from 90.0 mol % to 95.5 mol % Na from $Na_2CO_3$;
from 0.1 mol % to 2.7 mol % Ba from $BaCO_3$;
from 0.1 mol % to 5.3 mol % Sr from $SrCO_3$;
from 0.1 mol % to 6.6 mol % Ca from $CaCO_3$;
from 0.1 mol % to 5.5 mol % Ta from $Ta_2O_5$;
from 90.0 mol % to 95.5 mol % Nb from $Nb_2O_5$;
from 0.05 mol % to 1.20 mol % Ti from $TiO_2$;
from 0.1 mol % to 6.6 mol % Zr from $ZrO_2$;
from 0.05 mol % to 1.20 mol % Hf from $HfO_2$;
from 0.01 mol % to 1.40 mol % frit from $SiO_2$;
and then a mixture of rare-earth oxide, transition metal oxide, and frit comprises:
from 0.1 mol % to 2.4 mol % Mn from $MnO_2$;
from 0.01 mol % to 2.60 mol % W from $WO_3$;
from 0.6 mol % to 5.0 mol % Yb from $Yb_2O_3$;
from 0.01 mol % to 3.30 mol % frit from $B_2O_3$;
is further added as dopants together with suitable organic additives to form a ceramic slip.

Example 11

$Na_2CO_3$, $CaCO_3$, $Nb_2O_5$, $Gd_2O_3$, and $ZrO_2$ are mixed as starting ceramic raw materials to prepare a precursor after calcination at 750° C. to 1300° C., wherein starting ceramic materials comprise:
from 84.0 mol % to 95.2 mol % Na from $Na_2CO_3$;
from 0.1 mol % to 15.3 mol % Sr from $CaCO_3$;
from 84.0 mol % to 95.2 mol % Nb from $Nb_2O_5$;
from 0.1 mol % to 15.3 mol % Zr from $ZrO_2$;
from 0.1 mol % to 7.2 mol % Gd from $Gd_2O_3$;
and then a mixture of transition metal oxide and frit comprises:
from 0.1 mol % to 3.8 mol % Mn from $MnCO_3$;
from 0.01 mol % to 4.2 mol % frit from $SiO_2$;
is added as dopants to the primary component.

Example 12

$Na_2CO_3$, $CaCO_3$, $Nb_2O_5$, $Gd_2O_3$, $Ta_2O_5$, and $ZrO_2$ are mixed as starting ceramic raw materials to prepare a precursor after calcination at 750° C. to 1300° C., wherein starting ceramic materials comprise:
 from 84.0 mol % to 95.2 mol % Na from $Na_2CO_3$;
 from 0.1 mol % to 15.3 mol % Sr from $CaCO_3$;
 from 61.0 mol % to 75.6 mol % Nb from $Nb_2O_5$;
 from 0.5 mol % to 23.4 mol % Ta from $Ta_2O_5$;
 from 0.1 mol % to 15.1 mol % Zr from $ZrO_2$;
 from 0.1 mol % to 6.6 mol % Gd from $Gd_2O_3$;
 and then a mixture of transition metal oxide and frit comprises:
 from 0.1 mol % to 2.9 mol % Mn from $MnCO_3$;
 from 0.1 mol % to 3.3 mol % frit from $SiO_2$;
 is added as dopants to the primary component.

Preparation of Ceramic Disk Samples

Ceramic powders of primary component and sub-components were weighed in the ratios set forth in the examples, and wet-blended with a ball mill for 12 to 30 hours. Then, the blends were dried at 150° C. for 1 to 8 hours. Binder solution was added to the mixture in a mortar and then granulated to form granules. Then, the obtained granules were filled into a steel mold with a diameter of 13 mm and press-shaped at a pressure of 200 MPa to make a disk compact. The obtained compact was baked in air up to 375° C. for 10 to 100 hours to burn out the organic binder. Next, firing was applied in a reducing atmosphere to obtain a sintered disk. The firing was conducted at a peak temperature of 750 to 1300° C. for holding time of 1 to 6 hours. Then, silver electrodes were painted to the two surfaces of the sintered body to obtain disk ceramic capacitors corresponding to Example 11 and Example 12.

Preparation of Mlcc Samples

Sintered MLCC chips were obtained with a standard 3.2 mm×1.6 mm size and Nickel internal electrodes by sintering at a temperature range of 750 to 1300° C. The sintered MLCC chip contained 19 active dielectric ceramic layers and 20 Nickel electrodes. The average thickness of said dielectric ceramic layer was determined to be around 12 μm.

Electrical Measurements

The electrostatic capacitance and dielectric loss were measured under conditions of 1 kHz and AC 1V in a temperature range of −55° C. to 200° C. for each composition. The temperature coefficient of capacitance (TCC) was calculated based on the following equation:

$$TCC(\%)=[(C_T-C_{25})/C_{25}]\times 100$$

wherein T is temperature at which the measurement was conducted, $C_T$ and $C_{25}$ are the electrostatic capacitances at temperature T and 25° C., respectively.

Breakdown voltage (BDV) was measured at 25° C. with a voltage ramp rate of 5 V per second.

Insulation resistance (IR) was measured after 60 seconds charging under 50V DC voltage at 25° C.

Dielectric properties of disks made by Example 11 and Example 12 fired at 1250° C. are provided in TABLE 3.

TABLE 3

|  | Dielectric constant at 25° C. | TCC in the range of −55° C. to 200° C. |
| --- | --- | --- |
| Example 11 | 985 | −0.98% to 4.67% |
| Example 12 | 101 | −22.4% to 13.11% |

The results presented in TABLE 3 demonstrate that a wide range of dielectric constants can be obtained with a temperature coefficient of capacitance (TCC) within ±20% of the capacitance at 25° C. and more preferably within ±5% of the capacitance at 25° C.

Dielectric properties of MLCC's made by Example 11 and Example 12 fired at 1250° C. are provided in TABLE 4.

TABLE 4

| TCC in the range of −55° C. to 200° C. | −18.54% to 12.4% |
| --- | --- |
| Dielectric loss at 25° C. | 0.8% |
| Insulation Resistance at 25° C. | 69.93 GΩ |
| Breakdown voltage at 25° C. | 1143 V |

The results of TABLE 4 demonstrate the advantages when utilizing the inventive ceramics in a multi-layered ceramic capacitor.

Ceramic green sheet is further formed using a tape-casting process by spreading the slip onto a carrier film using a doctor blade method. After a suitable drying process, internal electrodes 3a and 3b of FIG. 1 are screen printed onto the ceramic green sheet using a conductive ink mainly containing base metals such as Ni, Cu or alloys thereof. Preferably, Ni or alloys primarily composed of Ni is used.

The obtained is further processed into a green chip via a stacking process. A plurality of ceramic green sheets without printed electrode are stacked as bottom cover layers 4b; then a plurality of ceramic green sheets with printed electrodes are laminated in alternate directions, so as to form alternating electrodes 3a and 3b that terminate at opposite ends; and finally a certain number of ceramic green sheets without printed electrode are stacked as top cover layers 4a. The laminated body is then pressed at between 20° C. and 120° C. to improve adhesion of all stacked layers, and further cut into individual green chips. The number of layers is not particularly limited herein with ten layers to hundreds of layers be suitable for demonstration of the invention.

The green chips are heated to 200° C. to 700° C. in atmospheric air or slightly reducing atmosphere for 0.1 to 100 hours to burn off the binders, and thereafter are sintered at a temperature between 750° C. to 1300° C. in a reducing atmosphere with an oxygen partial pressure between $10^{-16}$ atm to $10^{-4}$ atm. After sintering a reoxidation step may further apply to the chips by heating to a temperature no more than 1100° C. at an oxygen partial pressure between $10^{-14}$ atm to $10^{-3}$ atm. Thereby, a sintered chip is achieved.

The sintered chip is subjected to a corner rounding process by barrel or sand blast to expose internal electrodes formed at both ends of the ceramic sintered body. Subsequently external electrodes 5a and 5b are formed at both ends in such a way that: (1) copper terminations are formed by applying suitable copper paste at both ends of the sintered chip and baked at a temperature between 600° C. to 1000° C. in nitrogen or slightly reducing atmosphere for 1 minutes to 60 minutes; (2) a nickel-plated layer and a tin-plated layer or other suitable solder composition are further plated on the copper terminations via the barrel plating method to enhance solderability and prevent oxidation of the copper external electrodes. Thus, a multilayer ceramic capacitor 1 formed with base metal electrodes 3a and 3b and dielectric ceramic layers 2 comprising the disclosed dielectric composition in this invention is obtained.

The present invention discloses a dielectric ceramic composition that is possible for high temperature applications. Such a ceramic formulation is feasible to co-fire with base metal electrode in reducing atmosphere. Thereby, multilayered ceramic capacitors can be produced using the disclosed dielectric ceramic composition with base metal internal electrodes such as Ni.

Throughout the description listed ranges include all intermediate values having the same number of significant figures. By way of non-limiting example, a listed range of 0.01 to 0.05 includes: 0.01, 0.02, 0.03, 0.04 and 0.05. In the event that a range is listed with the listing having two numbers with different significant figures the one having the smallest increment significant figure determines the significant figures for both. By way of non-limiting example, if a range is listed as 1.0 to 5 it is intended to refer to all numbers from 1.0 to 5.0.

The following are incorporated herein by reference:
U.S. Pat. No. 9,564,271 to Banno et al.;
WO 2018-062084 A1 to Banno;
U.S. Pat. No. 10,710,934 to Banno et al.
Lead-free antiferroelectric: $xCaZrO_3$-$(1-x)NaNbO_3$ system ($0 \leq x \leq 0.10$), Shimizu et al., Dalton Transactions, volume 44, page 10763-10772, 2015;
Strategy for stabilization of the antiferroelectric phase (Pbma) over the metastable ferroelectric phase ($P2_1ma$) to establish double loop hysteresis in lead-free $(1-x)NaNbO_3$-$xSrZrO_3$ solid solution, Guo et al., Journal of Applied Physics, volume 117, page 214103, 2015;
A perovskite lead-free antiferroelectric $xCaHfO3$-$(1-x)NaNbO_3$ with induced double hysteresis loops at room temperature, Gao et al., Journal of Applied Physics, volume 120, page 204102, 2016;
Advantages of low partial pressure of oxygen processing of alkali niobate: $NaNbO_3$, Shimizu et al., Journal of the American Ceramic Society, volume 97, issue 6, page 1791-1796, 2014; and
Base metal co-fired multilayer piezoelectrics, Gao et al., Actuators, volume 5, issue 1, page 8, 2016.

The invention will be described with reference to the figures which are integral, but non-limiting, part of the specification provided for clarity of the invention. Throughout the various figures similar elements will be numbered according. The invention has been described with reference to preferred embodiments without limit thereto. One of skill in the art would realize additional embodiments which are described and set forth in the claims appended hereto.

The invention claimed is:

1. A dielectric ceramic composition comprising:
a primary component defined as:

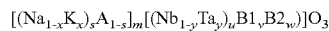

$$[(Na_{1-x}K_x)_sA_{1-s}]_m[(Nb_{1-y}Ta_y)_uB1_vB2_w)]O_3$$

wherein:
A is at least one element selected from the alkaline-earth element group of Mg, Ca, Sr, and Ba;
B1 is at least one element selected from the group of Ti, Zr, Hf, and Sn;
B2 is at least one element selected from transition metal element group of V, Cr, Mo, W, Mn, Fe, Co, Ni, Cu, and Zn;
and wherein:
x, y, s, u, v, and w are molar fractions of respective elements, and m is the molar ratio of $[(Na_{1-x}K_x)_sA_{1-s}]$ and $[(Nb_{1-y}Ta_y)_uB1_vB2_w)]$;
wherein
$0.93 \leq m \leq 1.07$;
$0.7 \leq s \leq 1.0$;
$0 \leq x \leq 0.05$;
$0 \leq y \leq 0.65$;
$0.7 \leq u \leq 1.0$;
$0 \leq v \leq 0.3$;
$1.001 \leq w \leq 0.100$;
a first sub-component comprising at least one rare-earth selected from the group consisting of Y, Sc, La, Ce, Pr, Nd, Sm, Eu, Gd, Tb, Dy, Ho, Er, Tm, Yb and Yu; and
a second sub-component comprising a frit.

2. The dielectric ceramic composition of claim 1 wherein said first sub-component is no more than 10 mol % parts relative to said primary component.

3. The dielectric ceramic composition of claim 1 wherein said second sub-component is selected from the group consisting of fluorides, silicates, borides, and oxides.

4. The dielectric ceramic composition of claim 1 wherein said second sub-component is within the range of 0.01 mol % to 15.00 mol % parts relative to said primary component.

5. The dielectric ceramic composition of claim 1 wherein said second sub-component is Li free.

6. The dielectric ceramic composition of claim 1 wherein said dielectric ceramic composition has a temperature coefficient of capacitance of ±25% at a temperature of −55° C. to 200° C.

7. The dielectric ceramic composition of claim 1 wherein said dielectric ceramic composition has a dielectric constant of at least 100 at 25° C.

8. The dielectric ceramic composition of claim 7 wherein said dielectric ceramic composition has a dielectric constant of at least 900 at 25° C.

9. A multilayered ceramic capacitor comprising:
a plurality of dielectric ceramic layers wherein each layer of said layers comprises a dielectric composition defined by:
a primary component defined as:

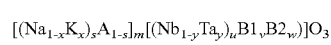

$$[(Na_{1-x}K_x)_sA_{1-s}]_m[(Nb_{1-y}Ta_y)_uB1_vB2_w)]O_3$$

wherein:
A is at least one element selected from the alkaline-earth element group of Mg, Ca, Sr, and Ba;
B1 is at least one element selected from the group of Ti, Zr, Hf, and Sn;
B2 is at least one element selected from transition metal element group of V, Cr, Mo, W, Mn, Fe, Co, Ni, Cu, and Zn;
and wherein:
x, y, s, u, v, and w are molar fractions of respective elements, and m is the molar ratio of $[(Na_{1-x}K_x)_sA_{1-s}]$ and $[(Nb_{1-y}Ta_y)_uB1_vB2_w)]$;
wherein
$0.93 \leq m \leq 1.07$;
$0.7 \leq s \leq 1.0$;
$0 \leq x \leq 0.05$;
$0 \leq y \leq 0.65$;
$0.7 \leq u \leq 1.0$;
$0 \leq v \leq 0.3$;
$1.001 \leq w \leq 0.100$;
a first sub-component comprising at least one rare-earth selected from the group consisting of Y, Sc, La, Ce, Pr, Nd, Sm, Eu, Gd, Tb, Dy, Ho, Er, Tm, Yb and Yu; and
a second sub-component comprising a frit;
a plurality of internal electrodes comprising base metals of Ni, Cu or alloys thereof; and
a pair of external electrodes formed at each end of the a main body of the multilayer ceramic capacitor.

10. The multilayered ceramic capacitor of claim 9 wherein said first sub-component is no more than 10 mol % parts relative to said primary component.

11. The multilayered ceramic capacitor of claim 9 wherein said second sub-component is selected from the group consisting of fluorides, silicates, borides, and oxides.

12. The multilayered ceramic capacitor of claim 9 wherein said second sub-component is within the range of 0.01 mol % to 15.00 mol % parts relative to said primary component.

13. The multilayered ceramic capacitor of claim 9 wherein said second sub-component is Li free.

14. The multilayered ceramic capacitor of claim 9 wherein said dielectric composition has a temperature coefficient of capacitance of ±25% at a temperature of −55° C. to 200° C.

15. The multilayered ceramic capacitor of claim 9 wherein said dielectric composition has a dielectric constant of at least 100 at 25° C.

16. The multilayered ceramic capacitor of claim 15 wherein said dielectric composition has a dielectric constant of at least 900 at 25° C.

17. A method of forming a multilayered ceramic capacitor comprising:
forming a dielectric ceramic precursor;
interleaving layers of said dielectric ceramic precursor with layers of metal to form a stack;
compressing said stack and sintering said dielectric ceramic precursor to form dielectric ceramic layers having a dielectric composition defined by:
a primary component defined as:

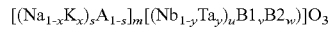

wherein:
A is at least one element selected from the alkaline-earth element group of Mg, Ca, Sr, and Ba;
B1 is at least one element selected from the group of Ti, Zr, Hf, and Sn;
B2 is at least one element selected from transition metal element group of V, Cr, Mo, W, Mn, Fe, Co, Ni, Cu, and Zn;
and wherein:
x, y, s, u, v, and w are molar fractions of respective elements, and m is the molar ratio of $[(Na_{1-x}K_x)_sA_{1-s}]$ and $[(Nb_{1-y}Ta_y)_uB1_vB2_w)]$;
wherein
$0.93 \le m \le 1.07$;
$0.7 \le s \le 1.0$;
$0 \le x \le 0.05$;
$0 \le y \le 0.65$;
$0.7 \le u \le 1.0$;
$0 \le v \le 0.3$;
$1.001 \le w \le 0.100$;
a first sub-component comprising at least one rare-earth selected from the group consisting of Y, Sc, La, Ce, Pr, Nd, Sm, Eu, Gd, Tb, Dy, Ho, Er, Tm, Yb; Yb and Yu; and
a second sub-component comprising a frit.

18. The method of forming a multilayered ceramic capacitor of claim 17 wherein said layers of dielectric ceramic precursor are prepared as a ceramic green paste comprising a mixture of inorganic materials and organic additives, wherein the inorganic materials comprise of at least one combination of precursor and dopant.

19. The method of forming a multilayered ceramic capacitor of claim 17 wherein said
transition metal elements are selected from the group consisting of V, Cr, Mo, W, Mn, Co, Ni, Cu, and Zn;
said rare-earth elements are selected from the group consisting of Y, Sc, La, Ce, Pr, Nd, Sm, Eu, Gd, Tb, Dy, Ho, Er, Tm, Yb and Yu; and
said frit is selected from the group consisting of fluorides, silicates, borides, and oxides.

20. The method of forming a multilayered ceramic capacitor of claim 18 comprising sintering of said ceramic green paste.

21. The method of forming a multilayered ceramic capacitor of claim 17 wherein said sintering is at a temperature from 750° C. to 1300° C.

22. The method of forming a multilayered ceramic capacitor of claim 17 wherein said sintering is conducted in an atmosphere with an oxygen partial pressure from $10^{-16}$ atm to $10^{-4}$ atm.

23. The method of forming a multilayered ceramic capacitor of claim 17 wherein said first sub-component is no more than 10 mol % parts relative to said primary component.

24. The method of forming a multilayered ceramic capacitor of claim 17 wherein said second sub-component is selected from the group consisting of fluorides, silicates, borides, and oxides.

25. The method of forming a multilayered ceramic capacitor of claim 17 wherein said second sub-component is within the range of 0.01 mol % to 15.00 mol % parts relative to said primary component.

26. The method of forming a multilayered ceramic capacitor of claim 17 wherein said second sub-component is Li free.

27. The method of forming a multilayered ceramic capacitor of claim 17 wherein said layers of metal comprise base metals of Ni, Cu or alloys thereof.

28. The method of forming a multilayered ceramic capacitor of claim 17 further comprising forming a pair of external electrodes at each end of the stack.

29. The method of forming a multilayered ceramic capacitor of claim 17 wherein said dielectric composition has a temperature coefficient of capacitance of ±25% at a temperature of −55° C. to 200° C.

30. The method of forming a multilayered ceramic capacitor of claim 17 wherein said dielectric composition has a dielectric constant of at least 100 at 25° C.

31. The method of forming a multilayered ceramic capacitor of claim 30 wherein said dielectric composition has a dielectric constant of at least 900 at 25° C.

* * * * *

UNITED STATES PATENT AND TRADEMARK OFFICE
CERTIFICATE OF CORRECTION

PATENT NO. : 11,802,087 B2
APPLICATION NO. : 17/585770
DATED : October 31, 2023
INVENTOR(S) : Hanzheng Guo and Abhijit Gurav It is certified that error appears in the above-identified patent and that said Letters Patent is hereby corrected as shown below:

In the Claims

Claim 1, Column 13, Line 63, change "$1.001 \leq w \leq 0.100$" to "$0.001 \leq w \leq 0.100$".
Claim 9, Column 14, Line 49, change "$1.001 \leq w \leq 0.100$" to "$0.001 \leq w \leq 0.100$".
Claim 17, Column 15, Line 43, change "$1.001 \leq w \leq 0.100$" to "$0.001 \leq w \leq 0.100$".

Signed and Sealed this
Twenty-eighth Day of November, 2023

Katherine Kelly Vidal
*Director of the United States Patent and Trademark Office*